Oct. 19, 1926.
D. A. ANDERSON
WELDING TABLE
Filed May 25, 1923
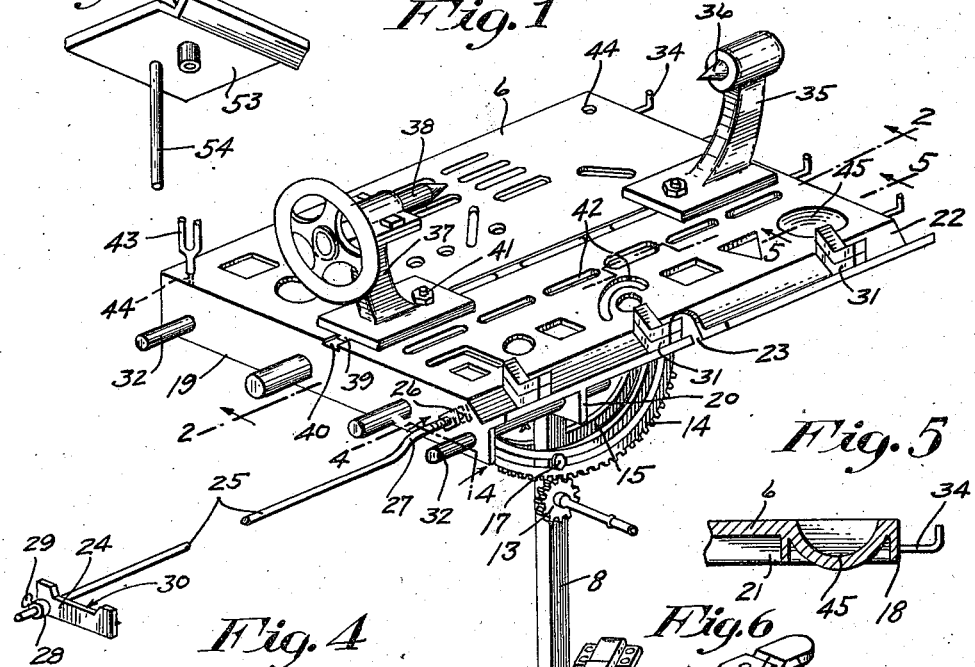
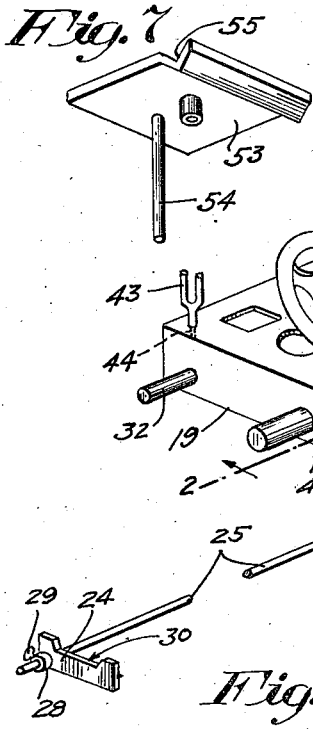
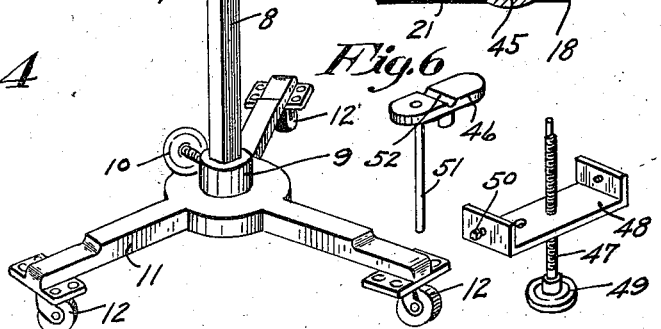
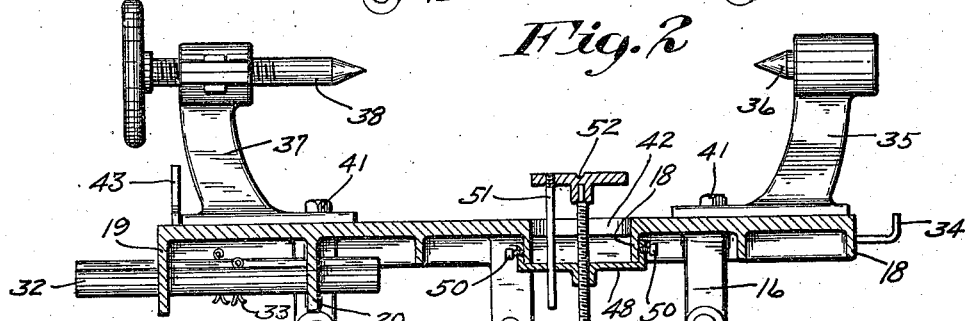
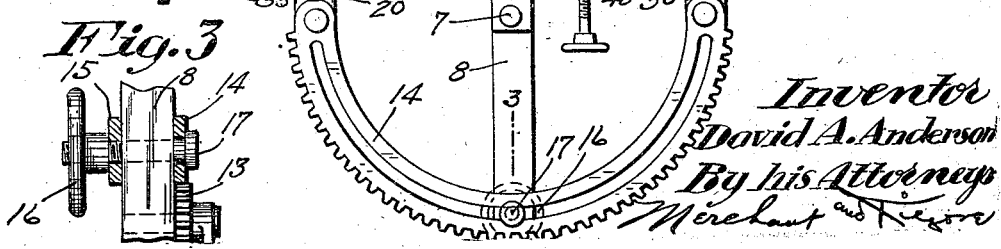
Inventor
David A. Anderson
By his Attorneys
Merchant and Rigore Patented Oct. 19, 1926.

1,603,307

UNITED STATES PATENT OFFICE.

DAVID A. ANDERSON, OF FARIBAULT, MINNESOTA.

WELDING TABLE.

Application filed May 25, 1923. Serial No. 641,421.

My invention has for its object to provide a highly efficient welding table for holding, aligning and leveling parts of different shapes, sizes, and lengths which a welder must set for welding so that the work may be quickly and efficiently done.

The invention further provides certain other novel features as will hereinafter appear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the welding table;

Fig. 2 is a view principally in longitudinal vertical section taken substantially on the irregular line 2—2 of Fig. 1, on an enlarged scale;

Fig. 3 is a detail view with some parts sectioned on the line 3—3 of Fig. 2, on an enlarged scale;

Fig. 4 is a detail view with some parts sectioned on the line 4—4 of Fig. 1, on an enlarged scale;

Fig. 5 is a detail view in section taken on the line 5—5 of Fig. 1, on an enlarged scale;

Fig. 6 is a perspective view of the aligning block removed from its adjusting and supporting means; and Fig. 7 is a perspective view showing another form of the aligning blocks.

The numeral 6 indicates a flat metal table top pivoted at 7 to the upper end of a post 8 for longitudinal tilting movement. The post 8 is mounted for raising and lowering movements in a hub-like base 9 and is secured thereto, in different vertical adjustments, by a hand screw 10 which has screw-threaded engagement with said base and impinges against the post 8. Said post 8, as shown, is square in cross section, and the opening thereof in the base 9 is correspondingly formed to prevent the post from turning therein. Formed with the base 9 are three radially extended legs 11, each of which is provided with a caster 12, and which casters afford a three-point support for the table top 6. This three-point support for the base is important for the reason that the table top 6 is firmly held irrespective of any unevenness in the floor. By vertically adjusting the post 8 in the base 9, the table top 6 may be positioned at the desired height.

To tilt the table top 6 on its pivot 7, there is provided a hand-crank-equipped pinion 13 journaled on the post 8 and meshing with a quadrantal rack 14, the ends of which are secured to depending lugs on said table top; and for locking said top in different tilted positions there is provided a quadrant 15 and a hand wheel-equipped nut 16 mounted on a headed screw stud 17. Both quadrants 14 and 15 have segmental slots through which the stud 17 projects, and which stud is shouldered to hold the same against endwise movement under the clamping action of the nut 16, and its head is arranged to hold the quadrant 15 against lateral movement from the post 8 but with freedom for movement under the tilting action of the table top 6. The hand wheel-equipped nut 16 is arranged to impinge against the quadrant 15 and frictionally clamp said quadrant onto the post 8 in a true horizontal position or in different tilted positions. The quadrant 15 is attached to the table top 6 in the same manner that the quadrant 14 is attached thereto. Obviously, by loosening the nut 16, the table top 6 may be tilted to any desired degree, and this tilting feature permits a job to be quickly leveled, thus eliminating unpractical methods of blocking up.

The table top 6 is provided at its back, right and left-hand edges with depending flanges, the latter two of which are indicated by the numerals 18 and 19, respectively. Said table top 6 is also provided with a depending flange 20 which extends parallel to the flange 19 and is laterally spaced inward therefrom. In addition to the flanges above noted, the table top 6, on its under side, is further reinforced by a multiplicity of cross ribs 21 which give said table top the required strength.

Formed in the front longitudinal edge portion of the table top 6 is a V-shaped groove 22 which extends the full length of said table top, and which table top, at substantially the longitudinal center of the groove 22, is provided with a flame passageway 23 which extends transversely into said groove. This V-shaped groove 22 is especially adapted for holding rods, shafts and the like, of different lengths and diameters, and the diverging walls thereof will hold parts to be welded properly aligned. Extra long rods, shafts or other parts in the groove 22 are further held by a supporting block 24 mounted on a rod 25 secured to the flange 19, through which it projects rearward of the groove 22, by opposing nuts 26. This rod 25 extends parallel to the groove 22 and is provided with a crank portion 27. As shown, the supporting block 24, at its rear end portion, is provided with a bossed hole 28 through which the rod 25 projects, and which supporting block is secured thereto by a thumb screw 29. In the upper edge of the supporting block 24 is a relatively wide notch 30.

Obviously, by loosening the thumb screw 29, the supporting block 24 may be adjusted longitudinally on the rod 25 toward and from the groove 22 or swung in a vertical plane, and by loosening one of the nuts 26, the rod 25 may be turned in the flange 19 to cause its crank portion 27 to raise or lower the supporting block 24 and impart an endwise movement thereto for adjusting the supporting block 24 to properly hold parts mounted in said groove.

To support and hold a crank shaft or other offset part, there is provided a plurality of loose V-shaped blocks 31 that are accurately formed to fit in the groove 22, or the one upon the other. These blocks 31 may be longitudinally adjusted in the groove 22 and built up to support parts having offsets that vary in length.

A plurality of laterally spaced stub shafts 32 of different diameters are mounted in aligned bores in the flanges 19 and 20 for endwise sliding movement. Each stub shaft 32 is provided with a cotter pin 33 arranged to engage the flanges 19 and 20 to limit the endwise movement of said stub shafts. The purpose of these stub shafts 32 is to support gears, pulleys, rings and the like, and they are especially well adapted to support gears while welding teeth thereon for the reason that said shafts can be set in true horizontal position by tilting the table top 6, and said gears rotated to bring the work at the top of said gears. When the shafts 32 are in their innermost positions, their outer ends are substantially flush with the outer face of the flange 19 so as to be out of the way.

Secured to the flange 18 is a plurality of hooks 34 for supporting the links of a chain or the like.

A head stock 35 having a fixed center 36, and a tail stock 37 having an adjustable center 38 are adjustably and removably supported on the table top 6. These head and tail stocks 35 and 37, respectively, are provided with dove-tail ribs 39 slidably mounted in a correspondingly formed groove 40 in the table top 6, and which groove extends parallel to the groove 22. Nut-equipped bolts 41, which extend through bores in the bases of said head and tail stocks and the groove 40, are provided for securing said head and tail stocks to the table top 6 in different adjustments. The attachment comprising the head and tail stocks takes the place of a lathe, for the purpose of trying out and straightening crank shafts, axle shafts, driving shafts, cam shafts or any other work to be swung on centers.

In the table top 6 are a multiplicity of differently shaped holes 42 in which may be bent flat, round, square, angular or any other shaped parts. A fork-like welding torch tip 43 is removably secured at different positions on the table top 6 by providing the same with a reduced stem adapted to be inserted in any one of a plurality of holes 44 in said table top. At the front right-hand corner of the table top 6 is a cup-like depression 45 for receiving babbitt as the same is melted from bearings.

The back and one of the sides of the table top 6 are planed true at right angles to each other so as to be used as a square in truing up work.

An aligning block 46 is mounted in one of the longitudinal openings 42 just forward of the head and tail stocks and is provided with a depending socket in which the upper end of an upright combined supporting and feed screw 47 is mounted. This feed screw 47 has screw-threaded engagement with intermediate portions of a U-shaped supporting bracket 48, and on its lower end is a hand piece 49 by which said screw may be turned. The arms of the supporting bracket 48 extend outward of the two ribs 18, at the respective opening 42, and are detachably secured thereto by opposing set screws 50. To prevent the aligning block 46 from turning on its feed screw 47 or with said screw, the same is provided with a depending stem 51 which extends through an aperture in the intermediate portion of the supporting bracket 48 with freedom for endwise movement.

By the use of this aligning block 46, a part supported thereon may be aligned with a part supported on the table top 6 and thus held while being welded. To hold a part on the aligning block 46, said block is provided with a transverse groove 52.

In Fig. 7 is shown another form of aligning block, indicated by the numeral 53, and its depending stem by the numeral 54. This aligning block 53 is adapted to be located in one of the larger openings 42 in the table top 6, and is provided with a V-shaped groove 55 for holding a part held thereon.

The above described invention has, in actual usage, proven highly efficient for the purpose had in view.

What I claim is:

1. A top for a table of the kind described having a groove below its upper face, means for tilting the table top, and a plurality of removable blocks adapted to be supported in the groove individually or the one upon the other and for adjustment longitudinally in said groove.

2. The structure defined in claim 1 in which the groove is V-shaped in cross section and the blocks correspondingly formed.

3. In a table of the kind described, the combination with a table top having an unobstructed groove below its upper face, of a supporting block having a rod attached to the table parallel to its groove for supporting said block outward of one end of the groove.

4. In a table of the kind described, the combination with a table top having an unobstructed groove below its top, of a supporting block having a rod attached to the table parallel to its groove for supporting said block outward of one end of the groove, said block being longitudinally adjustable on the rod.

5. In a table of the kind described, the combination with a table top having an unobstructed groove below its top, of a supporting block having a rod attached to the table parallel to its groove for supporting said block outward of one end of the groove, said block being angularly adjustable on the rod transversely of said groove.

6. In a table of the kind described, the combination with a table top having an unobstructed groove, of a supporting block having a rod attached to the table for supporting said block outward of one end of the groove, said rod being parallel to its groove and having a crank-acting portion which, when the rod is turned, will raise or lower the supporting block in respect to the groove.

In testimony whereof I affix my signature.

DAVID A. ANDERSON.